Nov. 14, 1967 V. O. MET 3,353,123

MICROWAVE FILTER COMPRISING ABSORBING STRUCTURES
FOR REMOVING SPURIOUS WAVE ENERGY

Original Filed March 31, 1959 5 Sheets-Sheet 1

VIKTOR O. MET
INVENTOR.

BY Urban H. Faubion

ATTORNEY

VIKTOR O. MET
INVENTOR.
BY Urban H. Faubion
ATTORNEY

MICROWAVE FILTER COMPRISING ABSORBING STRUCTURES FOR REMOVING SPURIOUS WAVE ENERGY

VIKTOR O. MET
INVENTOR.
BY Urban H. Faubion
ATTORNEY

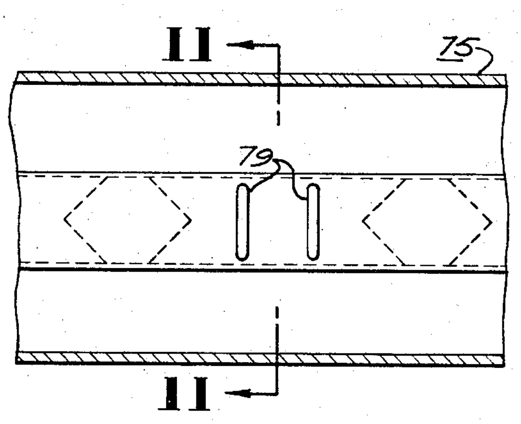
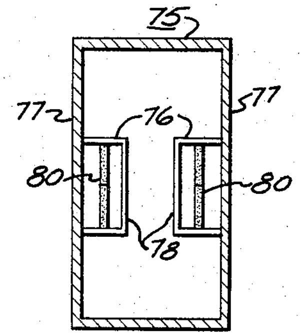
FIG. 11
FIG. 10
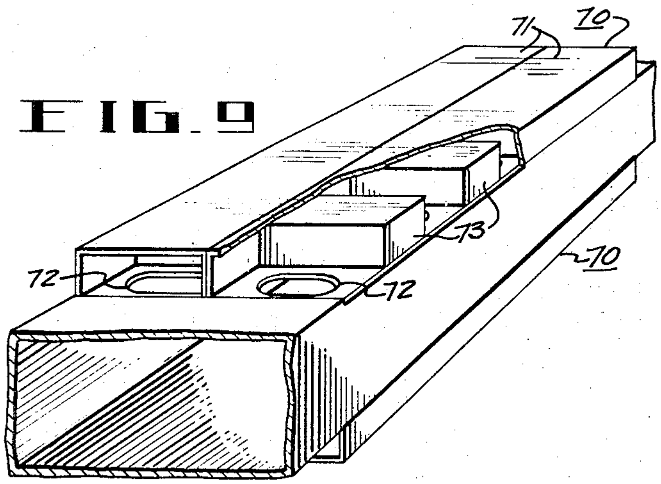
FIG. 9
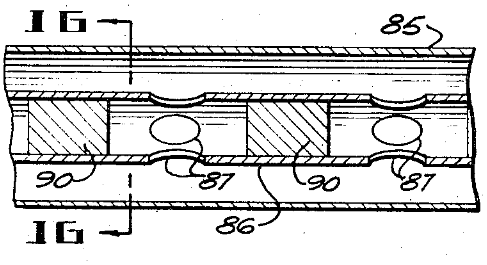
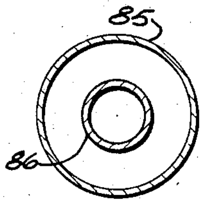
FIG. 16
FIG. 15
VIKTOR O. MET
INVENTOR.
BY [signature]
ATTORNEY VIKTOR O. MET
INVENTOR.
BY Urban H. Faubion
ATTORNEY United States Patent Office 3,353,123

Patented Nov. 14, 1967

3,353,123
MICROWAVE FILTER COMPRISING ABSORBING STRUCTURES FOR REMOVING SPURIOUS WAVE ENERGY

Viktor O. Met, Palo Alto, Calif., assignor to General Electric Company, a corporation of New York Continuation of application Ser. No. 184,626, Mar. 7, 1962. This application Sept. 1, 1965, Ser. No. 489,783
20 Claims. (Cl. 333—73)

This application is a continuation of application, Ser. No. 184,626, filed Mar. 7, 1962, now abandoned.

This invention relates to filters for high frequency electromagnetic waves and has for its object the provision of a device for frequency selective energy absorption in the microwave region.

The increased use of the microwave spectrum renders problems of interference more and more acute. Receivers are continually being made more sensitive and the power output of the transmitters available is being increased. Consequently, the provision of frequency selective microwave filters both for the transmitters as well as receiver channels is becoming a necessity. This is particularly true since microwave power generators, for example, magnetron oscillators, produce harmonic power in appreciable quantities. Thus, direct interference with systems operating at harmonic frequencies of the transmitter results when the harmonics are not suppressed at the source. An example is interference of the third harmonic of an S-band (2.6–3.95 kilomegacycles) transmitter with X-band (8.2–12.40 k.m.c.) systems.

Filtering the output of high power microwave sources is particularly difficult since such sources may be severely damaged by reflected energy, possibly energy of the higher harmonic frequencies, and because the filter must have high power handling capabilities due to its position relative to the generator.

Two of the most common types of microwave filter in use are the ladder or series resonator filter and the parallel resonator or branch filter. In the ladder type microwave filter, the input and output waveguides of the system are interconnected by a series of resonators coupled in tandem one to another so that a signal of any frequency must pass through all resonators in going from the input to the output. In the parallel resonator or branch filter, the input and output waveguides are connected by a number of resonators, each coupled directly to both input and output guides. Signal components of different frequencies can pass from the input to the output guides through different resonators.

Neither of these filter types has proven satisfactory for use with high power microwave frequency sources since resonant type microwave filters are reflective. Further, the configuration of resonance elements employed in such filters results in the existence of regions of high electric field strength. Thus, unless the filters employing such elements are evacuated, their power handling capabilities are not high. An additional disadvantage of the filters employing resonant sections is that the filter becomes complex to the point of impracticability if the harmonics of the unwanted modes launched in the system by the microwave generator are to be suppressed. This is true since each mode launched in the system requires special attention and eventually leads to an additional filter section.

Accordingly, it is an object of the present invention to provide a frequency selective filter for use in microwave frequencies wherein power at unwanted frequencies and modes is absorbed rather than reflected.

In carrying out the present invention, a frequency selective filter for energy in the microwave spectrum is provided by coupling an absorptive structure to the main waveguide through a suitably chosen aperture or apertures such that the fundamental is essentially unperturbed but harmonics are dissipated in the absorptive structure which is beyond cut off for the fundamental.

The novel features which are believed to be characteristic of the invention are set forth in the appended claims. The invention itself, however, both as to its organization and method of operation, together with further objects and advantages thereof, may best be understood by reference to the following description taken in connection with the accompanying drawings in which:

FIGURE 5 is a perspective view of an absorption structure similar to the periodic absorptive structure illustrated in FIGURES 2 and 3 which may be utilized in connection with a waveguide segment to provide an absorptive type filter;

FIGURES 6, 7, 8 and 9 are partially broken away perspective views illustrating still other embodiments of absorptive type filters employing principles of the present invention wherein both the energy which is transmitted and that which is absorbed is propagated in parallel guides;

FIGURE 10 shows a central, vertical, longitudinal section of a portion of a filter construction using a double ridged waveguide in accordance with principles of the present invention;

FIGURE 11 shows a sectional view of the filter of FIGURE 10 taken along lines 11—11 of that figure;

FIGURE 15 is a central, vertical, longitudinal section taken through another embodiment of a coaxial absorptive type filter utilizing concepts of the present invention; and FIGURE 16 is a sectional view through the coaxial filter of FIGURE 15 taken along section lines 16—16 of that figure.

Figures 1, 2:
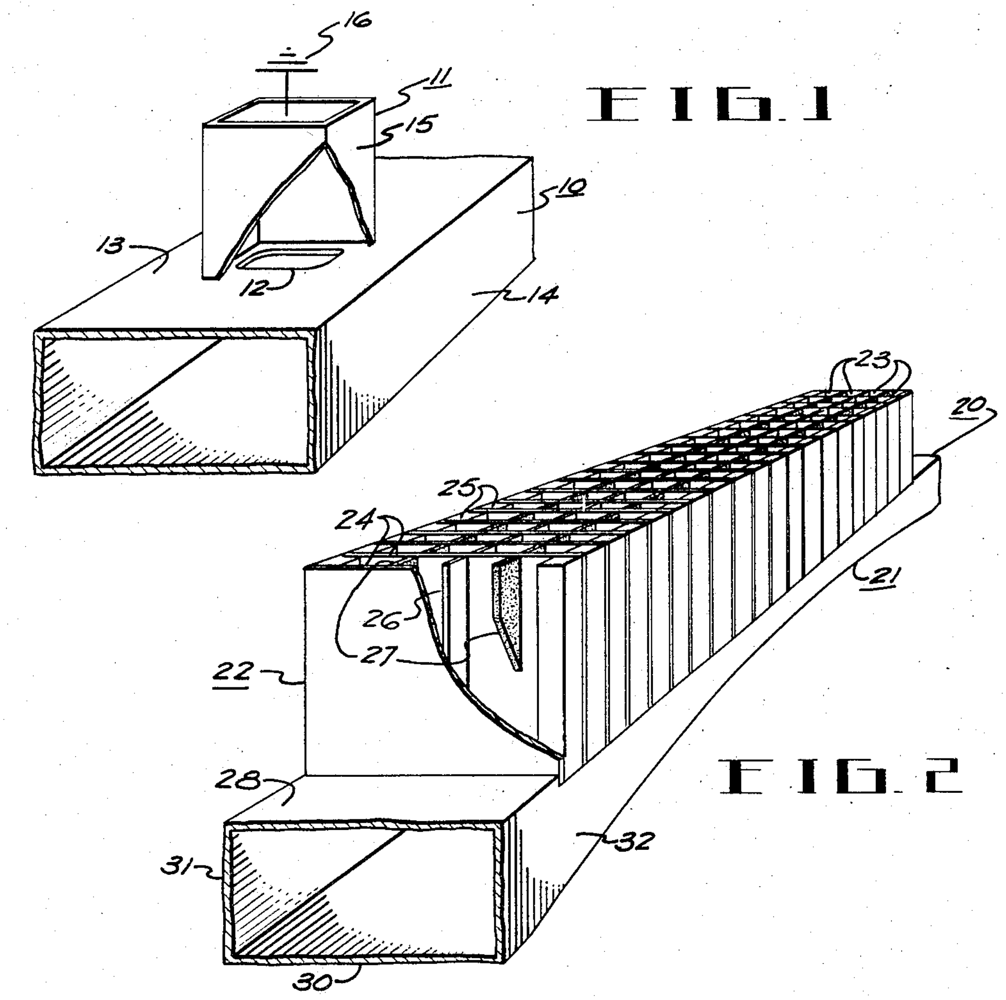
FIGURE 1 is a partially broken away perspective view of a filter of generalized shape which is used to illustrate principles of the present invention.
FIGURE 2 is a partially broken away perspective view of a particular embodiment of a filter employing the present invention.

FIGURE 1 is an illustration of a simple version of a frequency selective absorptive filter presented for the purpose of illustrating the basic concept of the invention. The simplified filter of this figure includes a main waveguide or waveguide segment 10 of rectangular cross section which is inserted in a waveguide system in such a manner that the fundamental frequency and mode and harmonics of the fundamental frequency with accompanying modes which appear in the waveguide system must be propagated through the waveguide segment 10. In order to remove energy of unwanted frequencies and modes from the main waveguide segment 10, an auxiliary waveguide section or absorber 11 is coupled to the main waveguide segment by means of a rectangular coupling aperture 12 in the upper broad wall 13 of the main guide 10 and centrally located between narrow side walls 14. As illustrated, the absorber 11 has a rectangular cross section of smaller dimensions than the main waveguide segment 10 and is placed adjacent to the upper board wall 13 of the main waveguide segment 10 with its longitudinal axis perpendicular to and intersecting the longitudinal axis of the main waveguide segment 10 and its narrow walls 15 parallel to the narrow side wall 14 of the main waveguide segment. Energy entering the absorber 11 is dissipated in a low reflective wide band load 16 which is illustrated schematically in FIGURE 1 by the conventional conductor to ground symbol.

The frequency selectivity of the filter is a result of designing the absorber waveguide section 15 to exhibit distinct cutoff properties at a frequency which denotes the upper end of the pass band of the filter and selecting the size and shape of the coupling aperture 12 to match the electric fields of the undesired electromagnetic waves propagating in the main waveguide 10 to the absorber section 16. As is well known in the art, the cut off properties of the absorber waveguide section 15 and the coupling aperture 12 are determined by the cross sectional dimensions and shape. For a discussion of design criteria to apply, see Principles and Applications of Waveguide Transmission by George C. Southworth, Van Nostrand Company, Inc., Princeton, N.J., 1950, and particularly Chapter V which starts on page 97. Below the cutoff frequency of the absorber 11, the coupling aperture 12 represents a reactive loading of the main guide, while at frequencies above cut off, energy enters the absorber 11 and is dissipated in its load 16. In this manner, the fundamental frequencies and mode or modes which are desired in the system pass through the main waveguide segment 10 substantially unaffected. That is, they are neither reflected nor attenuated in any substantial amount, whereas frequencies and modes which are not desired in the system, are coupled into the absorber segment 11 and absorbed therein, thus eliminating reflection of these frequencies back into the main system.

It will, of course, be recognized that the rectangular waveguides illustrated in FIGURE 1 are utilized for illustrative purposes and the principles may be applied to waveguides of any configuration. Further, it will be recognized that in practice a single absorber segment generally will not be sufficient to render any appreciable amount of energy dissipation in the desired stop band. Consequently, it is usually necessary to construct the absorber from an array of individual absorber waveguide sections. It is most advantageous to utilize a periodic array of such absorber sections. If it is possible to design each coupling aperture so that there is a perfect reflectionless match between the main waveguide and each absorptive waveguide section for energy of frequencies in the stop band of the filter, the arrangement of the absorptive sections in the absorber or absorptive array is not critical with respect to reflective properties. However, each coupling aperture represents a reactive loading of the main waveguide, and the effects of the reactances may be eliminated (tuned out) best and most completely if the coupling apertures are periodically spaced along the main waveguide.

Figure 3:
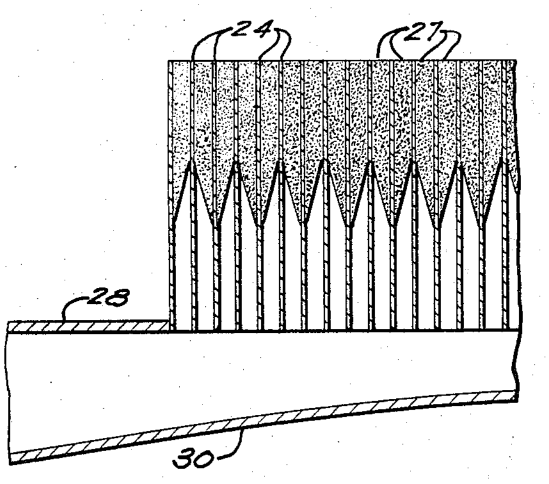
FIGURE 3 is a partially broken away, central, longitudinal, vertical section through the filter of FIGURE 2.

The filter 20 illustrated in FIGURES 2 and 3 follows the concept described with respect to the filter of FIGURE 1 and represents a preferred embodiment. The filter is constructed of the same two basic elements as the filter of FIGURE 1; that is, the filter includes a waveguide segment 21 through which electromagnetic waves of the system are propagated and a lossy or absorptive array 22 coupled to the waveguide to remove and absorb harmonics of the fundamental and unwanted modes propagated in the main guide 21.

The periodic absorptive structure 22 illustrated consists of an array of parallel waveguides 23 of rectangular cross section each of which is perpendicular to the main waveguide 21. That is, the longitudinal axis of each waveguide section 23 in the array is perpendicular to the longitudinal axis of the main waveguide 21. Like the single absorber waveguide section 15 in the filter of FIGURE 1, the cross sectional dimensions of each of the waveguide sections 23 which make up the array 22 are selected so that electromagnetic waves in the band of frequencies to be eliminated from the system are readily propagated and energy in the band of frequencies of interest are not propagated. Thus, the waveguide sections 23 are said to be beyond cut off for the fundamental frequencies.

The absorptive array 22 is a composite structure which is essentially defined by two rows or series of the individual waveguide sections 23. In each series the individual sections 23 are parallel and arranged broad wall to broad wall so that a plane passing through the longitudinal axis of each of the sections 23 in the particular series bisects the broad walls. The two rows or series of waveguide sections 23 are arranged side by side.

From an inspection of FIGURES 2 and 3, it is seen that the absorptive array 22 is not actually constructed of a plurality of separate waveguides but is formed by stacking a plurality of rectangular conductive plates 24 and conductive rods 25 of rectangular cross section with a pair of the rods 25 between opposite edges of each pair of the plates 24 to define a plurality of broad waveguides. The two series of side-by-side rows of waveguide sections 23 are formed by dividing the structure down its length with a planar conductive dividing vane 26. The structure is formed into a unit by brazing all of these parts together.

In order substantially to eliminate the energy coupled to the individual waveguide sections 23 from the system, a broad band absorptive termination 27 is provided in each waveguide section. In the absorptive array 22, illustrated, the termination in each individual waveguide section 23 comprises a planar resistive card 27 positioned in the end which is farthest away from the coupling between the main waveguide and the segment, in such a manner that it extends between and bisects the broad walls of the section 23. The lower end of each of the resistive cards 27 is tapered to provide a better impedance match and termination within the waveguide section. The resistive card terminations 27 in each series or row of waveguide sections 23 are reversed in successive sections in such a manner that the arrangement of resistive cards 27 on any broad wall between two waveguide sections 23 is allochiral. Thus, in a sectional side view through the array 22 showing the resistive cards 27 (see FIGURE 2), the cards 27 give the appearance of a series of arrows pointing down toward the main waveguide 21 at alternate broad walls of the waveguide sections 23.

In the arrangement illustrated, the lossy array 22 is coupled to the main waveguide through apertures defined by the open ends of the waveguide sections in the array. This is accomplished by removing or cutting away a portion of the top or upper broad wall 28 of the waveguide segment 21 and fitting the array 22 into the aperture thus formed in such a manner that open ends of the waveguide sections 23 are exposed to the interior of the main guide 21. Since the cross sectional dimension of the waveguide sections 23 or individual cells in the absorptive array is such that individual cells 23 do not propagate electromagnetic waves of the fundamental frequency, the apertures which couple the harmonics to the lossy array simply represent a reactive loading to the main guide 21 as far as the fundamental is concerned without otherwise interfering with propagation of the fundamental. On the other hand, the apertures freely couple harmonic energy to the absorptive array 22.

In order properly to match the impedance of the main waveguide 21 to the individual cells or waveguide sections 23 in the absorptive array 22 for the undesired harmonics, it has been found desirable to reduce the distance between upper and lower broad walls 28 and 30 respectively, i.e., the height of the narrow walls 31 and 32 of the main waveguide segment in a taper. This produces better coupling between the main waveguide segment 21 and the absorptive array 22 since it increases the concentration of electric fields in the coupling region and reduces the main guide impedance to a value more nearly equal to the impedance of the smaller waveguide sections 23 in the lossy array 22. Thus, the resultant shape of the main waveguide segment is defined by a planar upper broad wall 28 and planar parallel side walls 31 and 32 and a curviplanar lower broad wall 30 which is at its greatest distance from the upper broad wall at opposite ends of the segment 21 and curves toward the upper broad wall in the center of the segment 21. In the particular main waveguide segment 21 illustrated, the curve of the lower broad wall defines a double cosine taper.

The particular filter of FIGURES 2 and 3 was designed specifically to pass energy having frequencies between two and four kilomegacycles and absorb harmonic energy. In other words, the main waveguide segment 21 is selected to have a large enough cross sectional dimension freely to propagate energy in the pass band while the waveguide sections 23 in the array 22 exhibit distinct cut off properties at the upper edge of the pass band. To accomplish this, the array 22 is constructed of waveguide sections which have internal dimensions of about ½" x 1⅜". Each of the rows of sections in the array 22 is eight inches long and contains twenty-six sections. The curve of FIGURE 4 shows the transmission characteristics of this filter.

Figure 4:
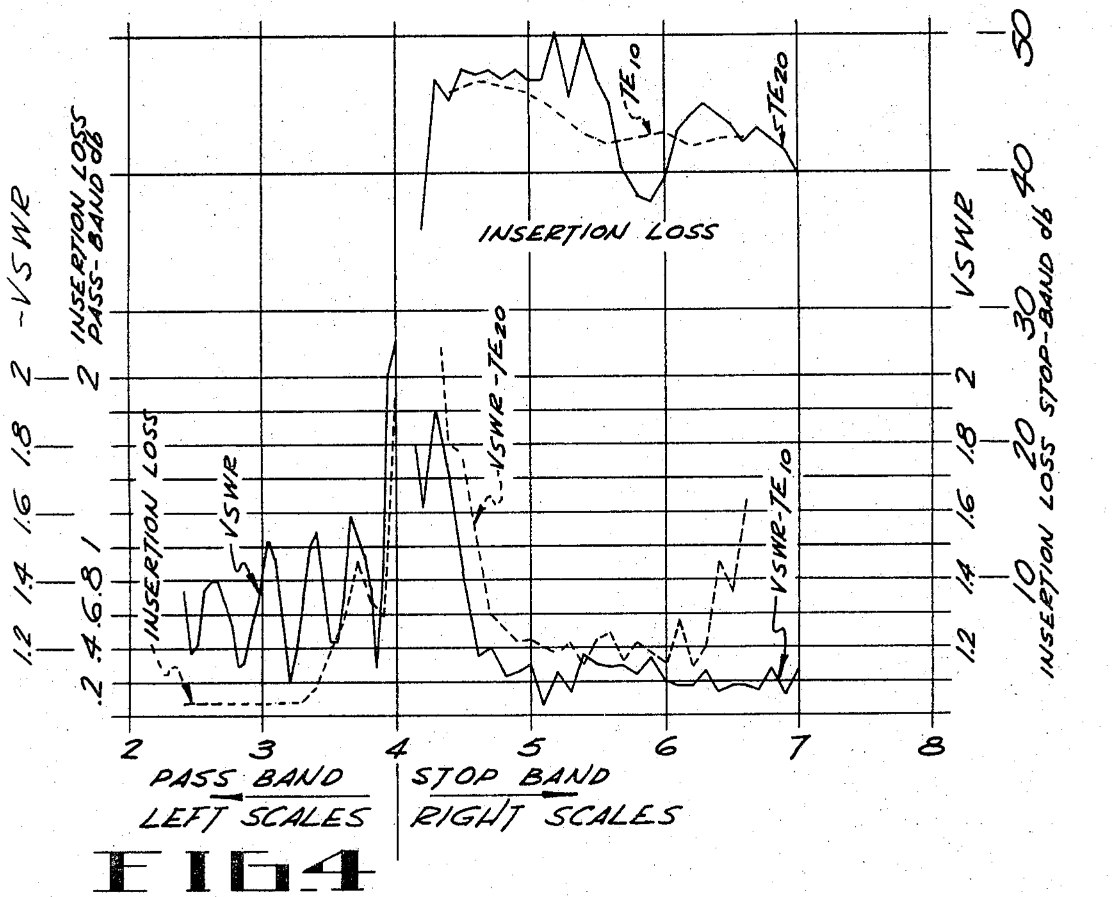
FIGURE 4 is a graph showing the Voltage Standing Wave Radio (VSWR) and insertion loss in decibels plotted along the axis of the ordinates and frequency in kilomegacycles (k.m.c.) illustrating the transmission characteristics of the absorption type filter of FIGURES 2 and 3.

In the graph of FIGURE 4, the insertion loss in decibels and the reflected power in terms of the Voltage Standing Wave Radio (VSWR) are plotted along the axis of the ordinates and the frequency in kmc. is plotted along the axis of the abscissas. The insertion loss in decibels is a measure of the ratio of the power delivered by a source to a matched load through the filter (designated $P_{oa}$) to the power delivered by the source to the matched load without the filter in the system (designated $P_{ob}$) and the value of the insertion loss in decibels is obtained by the following formula:

$$\text{Insertion Loss}=10\log_{10}\frac{P_{oa}}{P_{ob}}$$

The Voltage Standing Wave Radio represents the ratio of the maximum voltage ($V_{max.}$) measured along the guide 20, to the minimum voltage measured therealong, i.e., $V_{max.}/V_{min.}$. The VSWR is unity when there are no reflections in the guide, i.e., there is no standing wave in the waveguide and consequently the voltage is constant over the length of the guide. This represents the ideal condition.

As is seen from the Voltage Standing Wave Radio (VSWR) curve for the fundamental, i.e., in the pass band, the value is well below 1.5 over the entire band if a slight discontinuity corresponding to a periodic VSWR variation is tuned out. This is relatively easily accomplished. The insertion loss in the pass band is less than 0.2 db over almost the entire pass band and is less than 1 db over the full pass band. These figures indicate that the particular filter is extremely good over the entire pass band. A VSWR of 1.2 is considered by "systems" people to be excellent whereas "tube" people strive for a VSWR on the order of 2.5 db. Generally, any insertion loss in the pass band which is less than 1 db is considered to be excellent, whereas .2 db or less as found above is beyond expectations for most high power applications.

In order to measure the transmission characteristics of the filter at higher frequencies, i.e., in the stop band, it is necessary to launch more than one mode in the waveguide; that is, the transverse electric modes, $TE_{10}$ and $TE_{20}$. Inspection of FIGURE 4 illustrates that the VSWR of the $TE_{10}$ mode is below 1.05 over almost the entire pass band. The interpretation of the VSWR curve for the $TE_{20}$ mode requires an understanding that the mode launching hybrid utilized to launch this mode did not have a low VSWR except in the frequency range of from 5.7 to 6.4 kmc. Outside of this region, then, the measurements illustrated practically describe the characteristic of the hybrid which is highly reflective. However, it is seen that the VSWR for the $TW_{20}$ mode is below 1.25 within the range of validity.

The insertion loss of the filter in the stop band for the $TE_{20}$ and the $TE_{10}$ modes illustrates the excellent properties which can be obtained. For the $TE_{20}$ mode, the insertion loss remains fairly constant, at least through the frequency range of measurements, at a value above 40 db while the insertion loss of the $TE_{10}$ mode remains above 40 db for almost the entire frequency range of measurements. In general, an insertion loss for the unwanted modes in the stop band is considered excellent if it remains above 30 db.

It is recognized that at least three other modes could appear due to second harmonics in the system. However, the transmission characteristics illustrated and described here are considered to be the most important and the conclusions reached using these measurements are considered to be entirely valid since the $TE_{10}$ and the $TE_{20}$ modes are the most likely to give trouble. In addition, it is extremely difficult to launch and measure the other possible modes.

Figures 5, 6, 8:
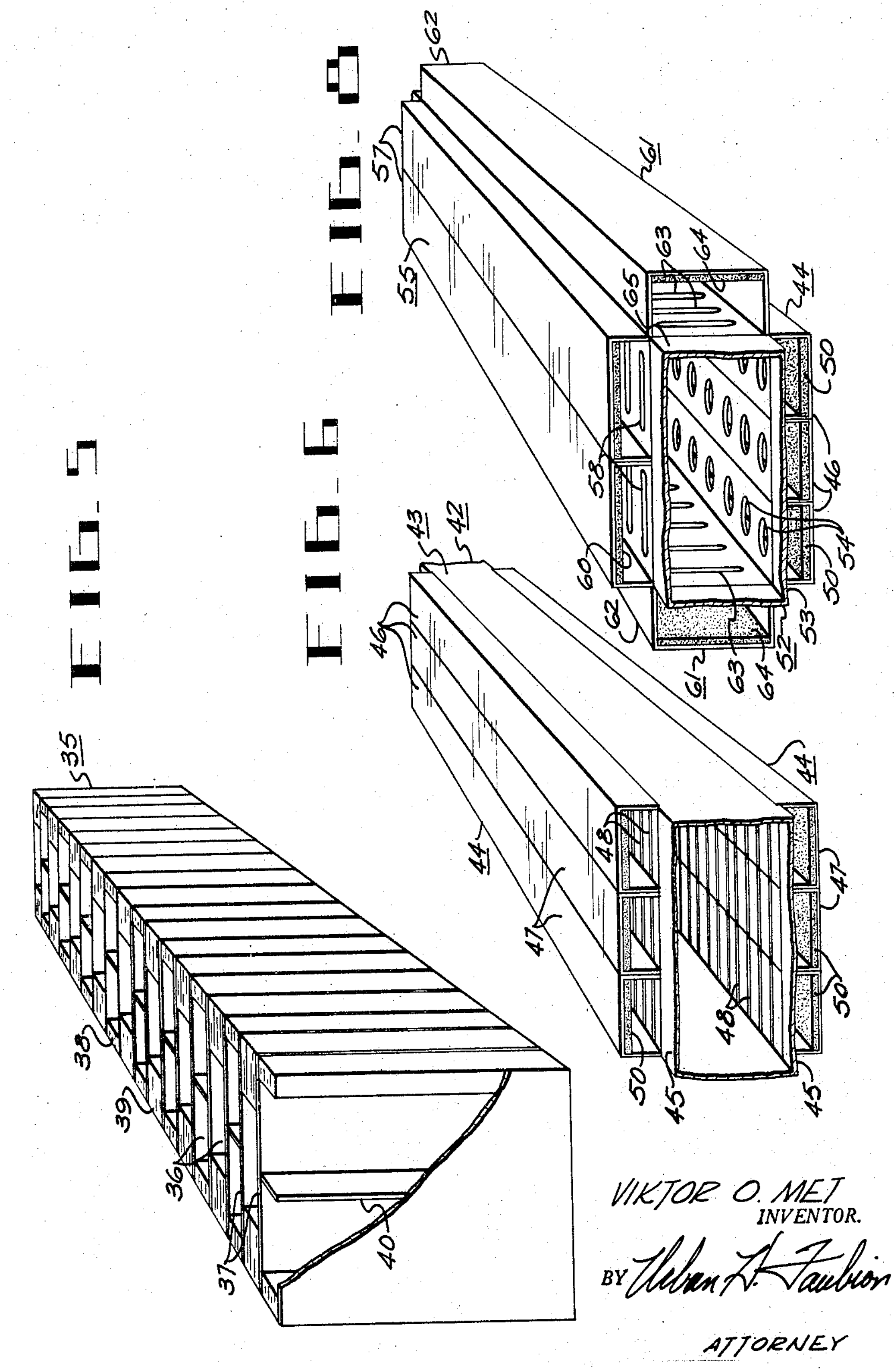

The absorptive array 35 illustrated in FIGURE 5 is another periodic structure which may be utilized with the waveguide segment 21 of FIGURES 2 and 3 in lieu of the absorptive array 22 illustrated. This array 35 is also a composite structure of waveguide sections 36 having cross sectional dimensions which are proportioned to render the sections beyond cut off for the fundamental electromagnetic wave energy in the main waveguide. However, the waveguide sections 36 are arranged in what may be termed two series. A plurality of pairs of individual waveguide sections 36 with the individual sections or cells of each pair positioned side by side with adjacent narrow walls form one such series. The other series of individual waveguide sections is made up of a plurality of single sections 36. The two series of waveguide sections are intercalated in such a manner that the common narrow walls of the series formed by the pairs of sections are coplanar and the plane so defined contains the longitudinal axes of the individual single sections in the second series of sections. In this manner, an electromagnetic wave being propagated down the main guide first encounters the coupling apertures to a pair of side by side waveguide sections 36, i.e., two sections divided by a central vane, and then the coupling aperture to a single waveguide 36 which is also perpendicular to the main guide segment and is centrally located with respect to the broad wall of the main guide. The electromagnetic wave successively encounters such arrangements down the length of the array 35. Thus, the array is very effective for coupling to both symmetrical and unsymmetrical modes in the main waveguide segment.

The absorptive array 35 of FIGURE 5 is also a stacked composite structure. The structure includes a plurality of rectangular planar conductive plates 37 similar to the plates 24 utilized for the array 22 of FIGURES 2 and 3, a first series of conductive spacer bars having rectangular cross sections of the same dimensions as the bars 25 of the array 22 and a second series of conductive spacer bars 39 having rectangular cross sections and the same thickness as the first series of spacer bars 38 but having a greater lateral dimension. The array is fabricated by stacking the conductive plates 37 with a pair of spacer bars between the outer edges of each pair of plates and using a pair of bars from alternate series between alternate plates. In this manner, the plates 37 form the broad walls of all of the waveguide sections 36 in the array 35 but alternate guides so formed have a broad wall which is twice as broad as the remaining guides. These broad guides are then bisected by conductive divider vanes 40 to form side by side pairs of waveguide sections 36 having the same dimensions as the intervening single sections.

The broad band absorptive loads for the individual waveguide sections 36 of FIGURE 5 are not illustrated although they are essential. They may be resistive cards of the type described in connection with FIGURES 2 and 3 and they may be similarly positioned in the waveguide sections 36.

The reason for using different arrangements of absorptive waveguide sections 36 in absorptive arrays, is to provide better coupling between the main guide and the absorptive array for those modes which it is most desirable to absorb in the array. For example, by definition, the transverse electric mode $TE_{20}$ means that the electric field in the guide is perpendicular to the sides of the guide and has no component along the length of the axis of the guide, and the subscript (20) means that there are two full half patterns of the electric field encountered when moving from one side or narrow wall of the guide to the opposite narrow wall of the guide while there are no half patterns encountered in passing across the other side of the cross section, i.e., between broad walls. It would be expected that this mode would couple well to an absorptive array with a central dividing vane, since the dividing vane presents a minimum of perturbation due to the fact that it occurs at the point in the main guide 21 where there is essentially no electric field; that is, at the point where the electric field makes its transition from one direction to the opposite direction. It is to be expected that such a mode would couple better to the absorber cells than modes wherein the electric field is a maximum at the dividing vane. The array 22 of FIGURES 2 and 3 and the series of side by side sections of the array of FIGURE 5 are examples of arrangements with good coupling to the $TE_{20}$ mode.

Using similar reasoning, it would be assumed that the $TE_{10}$ mode and other assymetrical modes would couple best, i.e., with least perturbation, to an absorptive array with coupling apertures at the center of the broad wall of the guide. This has proved to be the case. It follows, then, that one effective type of absorptive array is an array wherein successive portions of the array are coupled to the main guide by coupling apertures in different positions but still periodically along the length of the main guide. The array of FIGURE 5 is such a device.

In arrangements just described, energy in the main guide 21 essentially is deflected when entering the absorber in the direction perpendicular to its previous path of propagation. Such a deflection is not a requirement of the absorptive type filter. For example, FIGURE 6 illustrates a filter 42 of the absorptive type in which the energy in the main giude 43 and in the absorptive arrays 44 propagate in the directions which are parallel. The main waveguide segment 43 to be inserted in the waveguide system and propagate the electromagnetic waves in the system is a common rectangular guide in the particular filter illustrated. Identical absorptive arrays 44 are positioned on each of the broad walls 45 of the rectangular guide 43. Each array is comprised of three side-by-side rectangular waveguide sections 46 having coplanar broad walls 47 which extend along the length of the main guide structure parallel with the broad walls 45 of the main waveguide 43. Each absorptive array 44 constitutes a periodic structure by virtue of slots or coupling apertures 48 which are periodically spaced down the length of the guides.

Like the dimensions of coupling apertures for absorptive arrays previously discussed, the dimensions of the coupling apertures 48 are such that they represent inductive loading to electromagnetic wave energy of the fundamental frequencies in the main waveguide segment 43 but serve to couple the desired harmonic frequencies from the main guide to the auxiliary absorptive guides 46. Absorption of the harmonic frequencies is accomplished in each of the waveguide sections 46 by positioning a strip of absorptive material 50 such as a ceramic impregnated with resistive material, on the inside of the broad wall 47 of the guide opposite the main waveguide. The lossy strips 50 are placed on the wall of the absorptive waveguide sections 46 opposite the coupling apertures 48 so that they perform their function without interfering with wave energy of the fundamental frequency in the main waveguide segment.

Structurally, each of the lossy arrays 44 illustrated is formed by brazing three waveguides 46 together with coplanar broad walls 47 and cutting parallel coupling slots 43 all the way across one set of broad walls of the resultant array at intervals down the length. A section of the broad walls 45 of the main guide 43 is removed and each absorptive array is positioned in the aperture thus formed to expose the coupling apertures 48 to the interior of the main guide segment 43.

Each of the absorptive arrays 44 on the filter illustrated in FIGURE 6 effectively contains two dividing vanes, i.e., forms three side by side waveguide segments and hence represents a structure which is particularly effective for absorbing the transverse electric modes $TE_{10}$ and $TE_{30}$ for the reasons given in connection with the discussion concerning the lossy arrays 22 and 35 of the filter illustrated in FIGURES 2 and 3, and FIGURE 5. That is, the dividing vanes between the waveguide sections 46 of the lossy arrays 44 are positioned to provide a minimum perturbation of the electric fields of such modes and hence a maximum coupling between for these modes.

Figure 7:
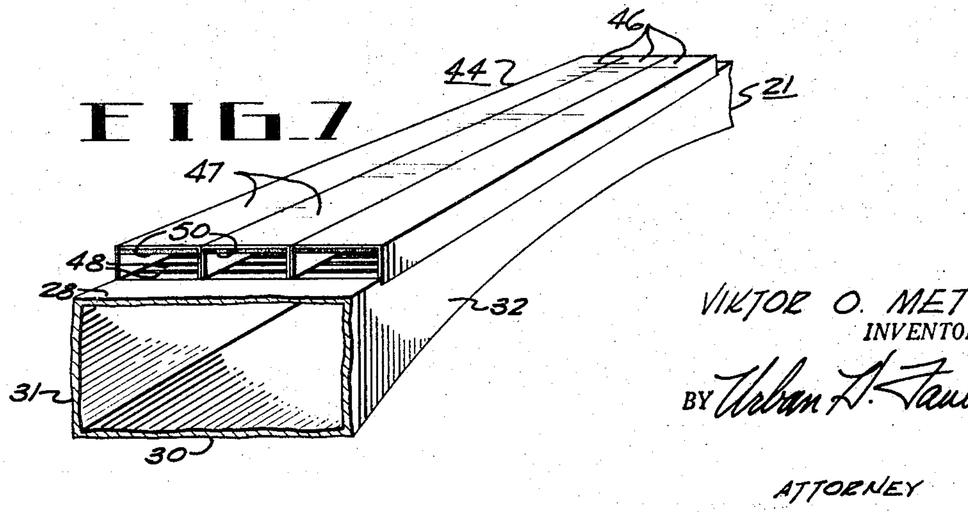

FIGURE 7 illustrates an absorptive periodic structure 44 of the type just described in connection with FIGURE 6 utilized with a double cosine tapered waveguide segment 21 of the type described in connection with FIGURES 2 and 3. Corresponding elements of the various figures are given the same reference numerals to simplify the description and drawings. This arrangement has the advantage of providing better coupling to the waveguide sections 46 in the lossy array 44 as described in connection with the double cosine tapered waveguide segment 21 of FIGURE 2. The device is constructed by positioning one of the absorptive arrays 44, illustrated and described in connection with FIGURE 6, in the aperture provided by the removed portion of the upper wall 28 of the waveguide segment 21.

Actual tests performed using this filter as illustrated indicate that the over all transmission characteristic of the fundamental as well as the third harmonic is excellent in terms of the VSWR. The insertion loss for the fundamental is better than 0.1 db. The tests are conclusive in showing that the fundamental in the waveguide segment 21 is not affected by the lossy strips 50 if the proper dimensions of the coupling apertures 48 and the waveguide sections 46 are selected and the absorber strips 50 are properly positioned. Aside from empirical results, the best guide to placing the lossy strips 50 where they do not affect the fundamental, is to place them in the waveguide sections 46 of the absorptive array 44 in such a manner that they are as far removed as practicable from coupling apertures 48.

The filter of FIGURE 8 is another frequency selective absorptive filter utilizing the same principles as the filters described in connection with FIGURES 6 and 7 but having absorptive arrays of several different constructions to provide absorption of energy of selected modes in accordance with discussion given in connection with the placement of dividing vanes in the absorptive arrays of FIGURES 2, 3 and 5.

The main waveguide segment 52 of the filter is a rectangular waveguide. The absorptive array 44 which is utilized in connection with the lower broad wall 53 of the filter, is of the same construction as the absorptive arrays utilized in connection with the filters of FIGURES 6 and 7 except that the coupling apertures 54 of this array are circular apertures periodically spaced along the length of each of the waveguide sections 46. In view of the correspondence of this array to the previously described arrays 44, corresponding elements in the various figures are given identical reference numerals and the array is not described in detail again.

The filter of FIGURE 8 utilizes an absorptive array 55 of a different configuration on its upper broad wall.

This lossy array 55 is constructed of a pair of waveguide sections 57 of rectangular cross section placed side by side with their longitudinal axes parallel and parallel to the longitudinal axis of the main waveguide segment 52. The dimensions of the broad wall of the two waveguide sections 57 are such that the two guides placed side by side are coextensive with the broad walls of the main guide segment 52. Coupling apertures 58 for each of the sections 57 are provided and constitute a succession of relatively narrow slots which are spaced periodically down the length of the lower broad wall of the waveguide sections 57. Lossy strips 60 are placed integrally adjacent the upper broad walls of the sections 57 to absorb electromagnetic energy therein.

The filter is also provided with two absorptive arrays 61 on opposite sides of the main waveguide segment 52, each of which constitutes a single waveguide section 62 of rectangular cross section having its broad wall dimension coincident with the narrow wall dimension of the main waveguide segment 52 and coupling apertures 63 defining relatively narrow slots which extend across the broad wall of the waveguide section 62 periodically disposed down the length of the waveguide segment. Again a strip of absorbent material 64 is placed along and coincident with the broad wall of each of the absorptive arrays 61 which is opposite the coupling apertures 63. In practice, the filter is constructed by putting the absorptive arrays 44, 45 and 61 together as described and then brazing the arrays so that they define the central portion of the waveguide segment 52. Pieces of rectangular waveguide 65 having the cross section of the main segment 52 thus defined are brazed to opposite ends of the lossy arrays to provide the desired filter length.

The filter of FIGURE 9 utilizes two absorptive arrays 70 which have side by side waveguide sections 71 similar to the upper absorptive arrays 55 described with respect to FIGURE 8. Each of the two waveguide arrays is arranged on an opposite broad wall of the main waveguide. The main difference between the absorptive arrays utilized with the filter of FIGURE 9 is that the coupling apertures 72 provided in each waveguide section 71 are of a slightly different configuration from those of FIGURE 9 and the energy absorption is provided in a little different way. In the embodiment of FIGURE 9, the coupling apertures 72 are almost elliptical. However, they are again periodically spaced along the length of each section 71. The lossy material in each waveguide section 71 consists of blocks of carbonized ceramic 73 which fill the entire cross section of each waveguide cell 71 between successive coupling apertures 72.

Figures 12, 17:
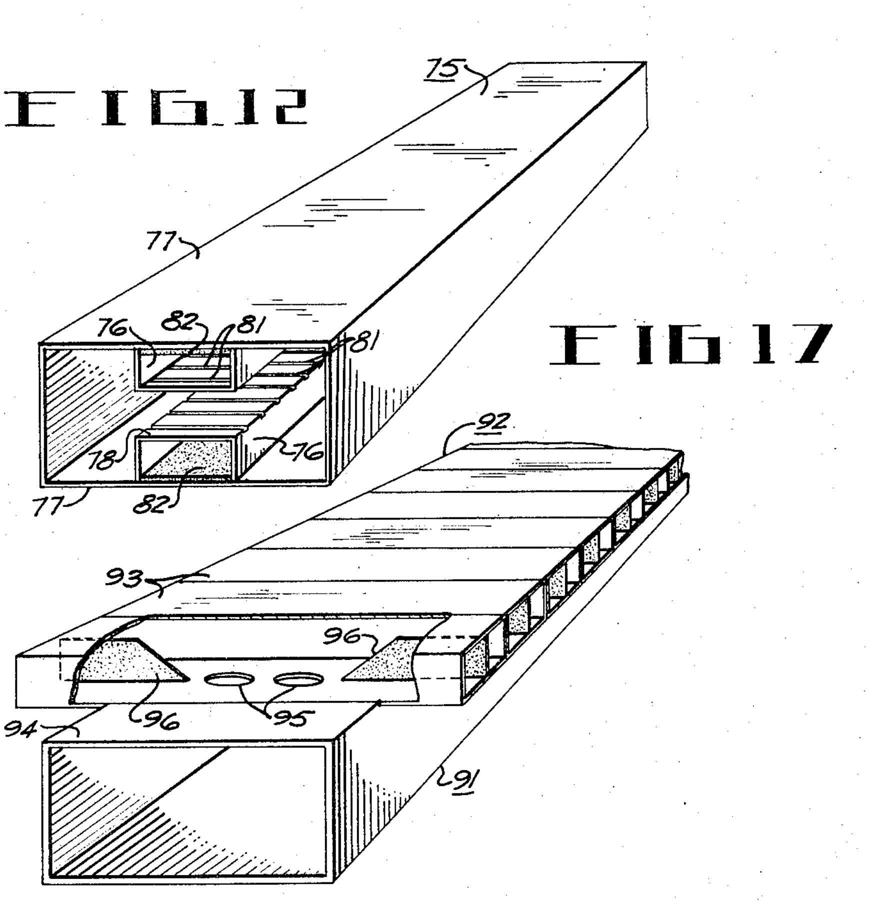
FIGURE 12 is a partially broken away perspective view of another filter constructed from a double ridged waveguide and utilizing concepts of the present invention.
FIGURE 17 is a partially broken away perspective view of another type of absorptive filter employing the concepts of the present invention.

FIGURES 10 and 11 and FIGURE 12 illustrate absorptive filters of ridged waveguide configuration. Since the main elements of these filters correspond exactly, they are given identical reference numerals to simplify the description and drawings. The main waveguide segments 75 of the filters are of rectangular cross section and have identical hollow rectangular ridges 76 on opposite broad walls 77 wherein the ridges essentially form rectangular waveguides with their broad walls 78 parallel to the broad walls 77 of the main waveguide 75. Each of the ridges 76 constitutes a periodic absorptive structure which is formed in the embodiment of FIGURES 10 and 11 by providing coupling apertures 79 which constitute a pair of slots extending across the top of each ridge relatively close together and an absorptive resistive card 80 and then another pair of coupling slots 79 and so on over the length of the ridge forming waveguide sections 76. The absorptive cards 80 are substantially planar and extend all the way across the broad dimension of the guide section 76 in a plane substantially half way between the broad walls of the waveguide. The cards are tapered at both ends, i.e., the ends nearest the coupling apertures, in such a manner that the tapered ends have the general appearance of arrows directed toward the nearest set of coupling apertures.

In the filter of FIGURE 12, each of the ridges 76 in the waveguide segment 75 constitutes an absorptive periodic structure which is formed by milling a series of coupling apertures, slots 81, across the broad wall of the ridges nearest the center of the guide segment 75 at periodic intervals along the length of the ridge. Absorption of electromagnetic waves in each of the ridge guide sections 76 is provided by a flat strip of carbonized ceramic 82 positioned on the broad wall of the absorptive periodic structure opposite the coupling apertures 81.

Figure 13:
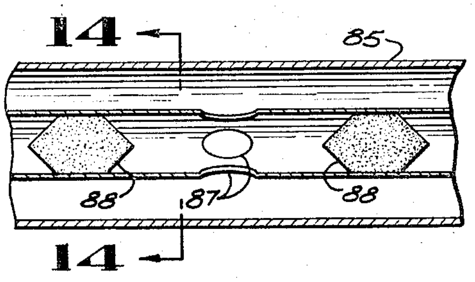
FIGURE 13 is a central, vertical, longitudinal section taken through a section of a coaxial absorptive type filter embodying the concepts of the present invention.
Figure 14:
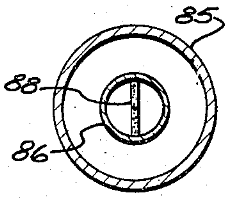
FIGURE 14 is a sectional view of the coaxial filter of FIGURE 13 taken along section lines 14—14.

FIGURES 13 and 14 and FIGURES 15 and 16 illustrate two embodiments of absorptive filters which use cylindrical waveguide segments 85. The absorptive structure in each of these cylindrical filters constitutes a hollow cylindrical waveguide section 86 coaxially disposed within the main cylindrical waveguide segment 85. In both embodiments, sets of four coupling apertures 87 of essentially circular configuration are periodically spaced down the length of the absorptive waveguide section 86. In each case, the four coupling apertures 87 in each set are spaced equidistant around the periphery of the absorptive waveguide section 86. The only difference between the filter arrangement illustrated in FIGURES 13 and 14 and that in FIGURES 15 and 16 is in the configuration of the absorptive elements. The absorbers illustrated in the filter of FIGURES 13 and 14 are planar resistive cards 88 having substantially the same configuration as the resistive cards 80 illustrated in the ridged filter of FIGURES 10 and 11. That is, they extend entirely across the internal diameter of the waveguide section 86 and are tapered toward the coupling apertures 87 on opposite ends. In the embodiment of FIGURES 15 and 16, solid blocks 90 of absorptive material such as a carbonized ceramic fill the entire waveguide section 86 between the coupling apertures 87 along the length of the waveguide section. As with the other absorptive sections, the dimensions of the centrally located absorptive section 86 in both filters is such that as to preclude propagation of energy of the fundamental in the centrally located section.

Another type of absorptive array in which the energy in the main guide segment essentially is deflected in a direction perpendicular to its previous path of propagation when entering the absorber, is illustrated in FIGURE 17. In this arrangement, the main waveguide segment 91 is of rectangular cross section, the absorptive array 92 is made of a plurality of waveguide sections 93 of rectangular cross section positioned side by side with their longitudinal axes parallel to each other and perpendicular to the direction of propagation in the main waveguide segment 91. However, unlike the absorptive arrays of FIGURES 2 and 5, the waveguide segments 91 are all positioned with their longitudinal axes in a plane parallel with the upper broad wall 94 of the main waveguide segment 91. The waveguide sections 93 are all coupled to the main waveguide 91 by removing a section of the top broad wall of the waveguide sections 93 which are adjacent the main waveguide 91.

In the embodiment illustrated, the coupling apertures 95 are symmetrically arranged on opposite sides of the center line of the broad wall of the main waveguide 91 and each end of each waveguide section 93 contains a resistive card 96 of planar construction positioned along the longitudinal axis of the section 93 in a vertical plane to define a centrally located dividing vane. In order to assure a non-reflective match in each waveguide section 93, the end of the resistive cards 96 which are nearest the coupling apertures 95 are sheared off at an angle. Once again, the cross section of the guide sections 93 in the absorptive array 92 is selected to prevent propagation of the fundamental electromagnetic energy from the main waveguide segment 91 and the coupling apertures 95 are selected to couple the desired frequencies and modes from the waveguide segment 91 to the array 92.

Thus, the objects of the present invention are carried out by providing a main guide propagating fundamental and harmonic power and auxiliary guides or absorbers with coupling from the main guide to the absorbers through apertures designed to match the fields of waves propagating from the main guide into the absorber wherein the energy entering the absorber is dissipated in low reflective wide band loads and the frequency selectivity of the device results from the fact that the absorbers are chosen to exhibit distinct cut off properties at certain frequencies denoting the upper end of the pass band in the absorptive filters thus obtained. Below the cut off frequency of the absorber, the coupling apertures merely represent the reactive loading of the main waveguide segment, while at frequencies above cut off, energy will enter the absorber and be dissipated in its load.

While particular embodiments of the invention have been illustrated, it will, of course, be understood that the invention is not limited to these embodiments, since many modifications may be made. It is contemplated that the appended claims will cover any such modifications as fall within the true spirit and scope of the invention.

What is claimed is:

1. A waveguide filter for transmitting first electromagnetic waves having predetermined fundamental frequency and for absorbing second electromagnetic waves of higher frequency, comprising: an elongated waveguide segment for transmitting therethrough said first electromagnetic wave; a wave energy absorbing means for eliminating substantially all wave energy of all frequencies above said predetermined frequency from said waveguide segment without substantial attenuation of the wave energy of frequencies below said predetermined frequency, said means comprising a plurality of waveguide sections having cross-sectional dimensions preventing propagation of said first electromagnetic waves and allowing propagation therein of said second electromagnetic waves, a plurality of apertures coupling said structure to said segment, each aperture directly coupling said segment to one of said sections for coupling said second electromagnetic waves from said segment to said waveguide sections said apertures being spaced apart along the length of said segment at intervals which are less than one-quarter wavelength of said first waves; and wave absorbent material in said waveguide sections to dissipate said second electromagnetic waves, said absorbent material being disposed sufficiently remote from said apertures to avoid substantial interception of said first electromagnetic waves.

2. An electromagnetic wave filter for transmitting wave energy of frequencies within a predetermined pass frequency band and for absorbing wave energy of frequencies above said pass frequency band, comprising: an elongated main waveguide for receiving electromagnetic wave energy, said main waveguide having cross-section dimensions to propagate waves of frequencies within said pass frequency band; and wave energy absorbing means for eliminating substantially all wave energy of frequencies above said pass frequency band from said main waveguide without substantial attenuation of the pass frequency band wave energy including a plurality of secondary waveguide segments coupled to said main waveguide, each of said secondary waveguide segments having cross-section dimensions such that said segments are above cutoff for waves of frequencies within said pass frequency band, each of said secondary waveguide segments being directly coupled to said main waveguide by at least one coupling aperture, the area of each coupling aperture being substantially equal to the cross-section area of its associated secondary waveguide segment; and load means disposed to directly receive wave energy propagated by said secondary waveguide segments, said load means being positioned a sufficient distance from said coupling apertures to avoid substantial disturbance of waves of frequencies within said pass frequency band.

3. An electromagnetic wave filter for transmitting wave energy of frequencies within a predetermined pass frequency band and for absorbing wave energy of frequencies above said pass frequency band, comprising: an elongated main waveguide for receiving electromagnetic wave energy, said main waveguide having cross-section dimensions to propagate waves of frequencies within said pass frequency band; and wave energy absorbing means for eliminating substantially all wave energy of frequencies above said pass frequency band from said main waveguide without substantial attenuation of the pass frequency band wave energy including a plurality of secondary waveguide segments coupled to said main waveguide, each of said secondary waveguide segments having cross-section dimensions such that said segments are above cutoff for waves of frequencies within said pass frequency band, each of said secondary waveguide segments being directly coupled to said main waveguide by at least one coupling aperture, the area of each coupling aperture being substantially equal to the cross-section area of its associated secondary waveguide segment, the spacing between said apertures being less than one-quarter wavelength at the upper frequency limit of said pass frequency band; and load means disposed to directly receive wave energy propagated by said secondary waveguide segments, said load means being positioned a sufficient distance from said coupling apertures to avoid substantial disturbance of waves of frequencies within said pass frequency band.

4. An electromagnetic wave filter for transmitting wave energy of frequencies within a predetermined pass frequency band and for absorbing wave energy of frequencies above said pass frequency band, comprising: a main waveguide segment for receiving electromagnetic wave energy, said main waveguide segment being designed to propagate waves of frequencies within said pass frequency band; a wave energy absorptive means for eliminating substantially all wave energy of all frequencies above said predetermined frequency from said waveguide segment without substantial attenuation of the wave energy of frequencies below said predetermined frequency, said means comprising an array of waveguide sections arranged with parallel axes including at least two series of such sections, each of said waveguide sections having cross section dimensions which prevent propagation therein of wave energy of frequencies within said pass frequency band and which allow propagation therein of wave energy of frequencies above the upper frequency limit of said pass frequency band, each of said waveguide sections being coupled to said main waveguide segment by at least one coupling aperture; and electromagnetic energy absorbent material positioned to directly receive the wave energy propagated by said waveguide sections.

5. An electromagnetic wave filter for transmitting wave energy of frequencies within a predetermined pass frequency band and for absorbing wave energy of frequencies above said pass frequency band, comprising: a main waveguide segment for receiving electromagnetic wave energy, said main waveguide segment being designed to propagate waves of frequencies within said pass frequency band; and a wave energy absorptive means for eliminating substantially all wave energy of all frequencies above said predetermined frequency from said waveguide segment without substantial attenuation of the wave energy of frequencies below said predetermined frequency, said means comprising an array of waveguide sections including at least two series of such sections, said series of said sections being arranged in sets of at least two adjacent series of said sections, each of said waveguide sections having cross section dimensions which prevent propagation therein of wave energy of frequencies within said pass frequency band and which allow propagation therein of wave energy of frequencies above the upper frequency limit of said pass frequency band, each of said waveguide sections being coupled to said main waveguide segment by at least one coupling aperture.

6. An electromagnetic wave filter for transmitting wave energy of frequencies within a predetermined pass frequency band and for absorbing wave energy of frequencies above said pass frequency band, comprising: an elongated main waveguide for receiving electromagnetic wave energy, said main waveguide being designed to propagate waves of frequencies within said pass frequency band; and wave energy absorbing means for eliminating substantially all wave energy of frequencies above said pass frequency band from said main waveguide without substantial attenuation of the pass frequency band energy including a plurality of secondary waveguide segments, each designed to propagate wave energy of frequencies above said pass frequency band and to prevent propagation therein of wave energy of frequencies within said pass frequency band; and a plurality of coupling apertures, each of said secondary waveguide segments being directly coupled to said main waveguide by at least one of said apertures, the spacing of said apertures along the length of said main waveguide being less than one-quarter wavelength at the frequency of the upper limit of said pass frequency band.

7. An electromagnetic wave filter for transmitting wave energy of frequencies within a predetermined pass frequency band and for absorbing wave energy of frequencies above said pass frequency band, comprising: an elongated main waveguide for receiving electromagnetic wave energy, said main waveguide being designed to propagate waves of frequencies within said pass frequency band; and wave energy absorbing means for eliminating substantially all wave energy of frequencies above said pass frequency band from said main waveguide without substantial attenuation of the pass frequency band energy including a plurality of secondary waveguide segments, each designed to propagate wave energy of frequencies above said pass frequency band and to prevent propagation therein of wave energy of frequencies within said pass frequency band; a plurality of coupling apertures, each of said secondary waveguide segments being directly coupled to said main waveguide by at least one of said apertures, the spacing of said apertures along the length of said main waveguide being less than one-quarter wavelength at the frequency of the upper limit of said pass frequency band; and wave energy absorbent material disposed to directly receive wave energy propagated by said secondary waveguide segments.

8. An electromagnetic wave filter for transmitting with low attenuation wave energy of frequencies within a predetermined pass frequency band and for absorbing wave energy of frequencies above said pass frequency band, comprising: an elongated main waveguide segment for receiving electromagnetic wave energy, said main waveguide segment being designed to propagate waves of frequencies within said pass frequency band; and wave energy absorbing means for eliminating substantially all wave energy of frequencies above said pass frequency band from said main waveguide without substantial attenuation of the pass frequency band energy including a plurality of coupling apertures in said main waveguide segment; a plurality of absorber waveguide segments, each directly coupled to at least one of said apertures, and each of said absorber waveguide segments having cross-section dimensions which prevent propagation therein of wave energy of frequencies within said pass frequency band and which allow propagation therein of wave energy of frequencies above the upper frequency limit of said pass frequency band; and a low-reflective wideband load disposed within each of said absorber waveguide segments for dissipating wave energy propagated by said absorber waveguide segments.

9. An electromagnetic wave filter for transmitting wave energy of frequencies within a predetermined pass frequency band and for absorbing wave energy of frequencies above said pass frequency band, comprising: a rectangular main waveguide for receiving electromagnetic energy of said main waveguide having broad and narrow wall dimensions to propagate waves having frequencies within said pass frequency band; and wave energy absorbing means for eliminating substantially all wave energy of frequencies above said pass frequency band from said main waveguide without substantial attenuation of the pass frequency band energy including at least two secondary waveguide arrays each coupled to a respective wall of said main waveguide, each secondary waveguide array comprising at least two adjacent series of secondary waveguides, each of said secondary waveguides having cross-section dimensions above cutoff for wave energy of frequencies within said pass frequency band; and means coupling each of said secondary waveguides to said main waveguide.

10. An electromagnetic wave filter for transmitting wave energy of frequencies within a predetermined pass frequency band and for absorbing wave energy of frequencies above said pass frequency band, comprising: an elongated main waveguide for receiving electromagnetic wave energy; said main waveguide having cross-section dimensions to propagate waves of frequencies within said pass frequency band; and wave energy absorbing means for eliminating substantially all wave energy of frequencies above said pass frequency band from said main waveguide without substantial attenuation of the pass frequency band energy including a plurality of secondary waveguides connected to said main waveguide, each of said secondary waveguides being coupled to said main waveguide by a respective coupling aperture, the cross-section dimensions of said secondary waveguides and the size, shape and orientation of said coupling apertures being selected to couple wave energy of frequencies above said pass frequency band from said main waveguide into said secondary waveguides without substantial disturbance of wave energy of frequencies within said pass frequency band; and a low-reflective, wide-band load disposed to directly receive wave energy propagated by said secondary waveguides.

11. An electromagnetic wave filter for transmitting wave energy of frequencies within a predetermined pass frequency band and for absorbing wave energy of frequencies above said pass frequency band, comprising: a rectangular main waveguide for receiving electromagnetic energy, said main waveguide having broad and narrow wall dimensions to propagate waves having frequencies within said pass frequency band; and wave energy absorbing means for eliminating substantially all wave energy of frequencies above said pass frequency band from said main waveguide without stubstantial attenuation of the pass frequency band energy including a plurality of planar conductive plates conductively joined to at least one wall of said main waveguide and positioned normal thereto, said plates forming at least two adjacent series of waveguide sections having cross-section dimensions such that said sections are beyond cutoff for waves having frequencies within said pass frequency band; a plurality of coupling apertures in said one wall of said main waveguide, each of said coupling apertures providing direct coupling between said main waveguide and a respective one of said waveguide sections for wave energy of frequencies above said pass frequency band; and a low-reflectivity wideband load disposed to directly receive wave energy propagated by said waveguide sections.

12. An abosorptive filter for removing electromagnetic wave energy from a waveguide system wherein desired wave energy of fundamental frequency and undesired wave energy of higher frequency is propagated, the combination of: a waveguide segment to be inserted in the waveguide system such that electromagnetic waves therein must pass through said waveguide segment; an absorptive means for eliminating substantially all wave energy of all frequencies above said predetermined frequency from said wave guide segment without substantial attenuation of the wave energy of frequencies below said predetermined frequency, said means comprising an array of waveguide sections having cross sectional dimensions which preclude propagation of wave energy of said fundamental frequency therein but which allow propagation therein of said undesired wave energy, said sections being arranged side by side with parallel longitudinal axes, said array disposed adjacent said waveguide segment with the longitudinal axes normal, and at least one coupling aperture provided between each section and said segment whereby said coupling apertures are spaced along the length of said segment at intervals which are less than one-quarter wavelength at said fundamental frequency; and electromagnetic energy absorbent material positioned in each of said waveguide sections to absorb electromagnetic wave energy therein.

13. An electromagnetic wave filter for transmitting wave energy of frequencies within a predetermined pass frequency band and for absorbing wave energy of frequencies above said pass frequency band, comprising: a rectangular main waveguide for receiving electromagnetic energy, said main waveguide having broad and narrow wall dimensions to propagate waves having frequencies within said pass frequency band; and wave energy absorbing means for eliminating substantially all wave energy of frequencies above said pass frequency band from said main waveguide without substantial attenuation of the pass frequency band wave energy including a plurality of planar conductive plates conductively joined to at least one wall of said main waveguide and positioned normal thereto, said plates forming a series of waveguide sections having cross-section dimensions such that said sections are beyond cutoff for waves having frequencies within said pass frequency band; a plurality of coupling apertures in said one wall of said main waveguide, each of said coupling apertures providing direct coupling between said main waveguide and a respective one of said waveguide sections for wave energy of frequencies above said pass frequency band; and a low-reflectivity wide band load disposed to directly receive wave energy propagated by said waveguide sections.

14. An electromagnetic wave filter for transmitting wave energy of frequencies within a predetermined pass frequency band and for absorbing wave energy of frequencies above said pass frequency band, comprising: a rectangular main waveguide for receiving electromagnetic energy, said main waveguide having broad and narrow wall dimensions to propagate waves having frequencies within said pass frequency band; and wave energy absorbing means for eliminating substantially all wave energy of frequencies above said pass frequency band from main waveguide without substantial attenuation of the pass frequency band wave energy including at least one secondary waveguide array coupled to at least one wall of said main waveguide, each secondary waveguide array comprising a plurality of elongated secondary waveguide channels, each secondary waveguide channel having an input end and a load end, the input ends of said secondary waveguide channels being positioned adjacent said one wall of said main waveguide, each of said secondary waveguide channels having cross-section dimensions such that said channels are above cutoff for wave energy of frequencies within said pass frequency band, said secondary waveguide channels being positioned as closely together as is practically possible along said one wall of said main waveguide; a plurality of coupling openings, each opening being formed in said one wall of said main waveguide in a position adjacent the input end of a respective one of said secondary waveguide channels, each of said openings having as large a size as is practically possible consistent with the cross-section dimensions of its respective secondary wave-guide channel; and load means disposed at said load end of each said secondary waveguide channels for directly receiving and absorbing wave energy propagated therein, said load means being positioned at a distance from said one wall of said main waveguide sufficient to avoid substantial absorption of wave energy of frequencies within said pass frequency band.

15. The filter of claim 14 wherein adjacent walls of adjacent ones of said secondary waveguide channels are formed by a common conductive member.

16. A frequency selective absorptive filter for removing electromagnetic wave energy of predetermined frequencies and modes from a waveguide system wherein electromagnetic wave energy of desired fundamental frequency and undesired electromagnetic wave energy of higher frequency is propagated including the combination of a waveguide segment to be inserted in the waveguide system such that electromagnetic waves therein must pass through said waveguide segment; an absorptive means for eliminating substantially all wave energy of all frequencies above said predetermined frequency from said waveguide segment without substantial attenuation of the wave energy of frequencies below said predetermined frequency, said means comprising an array of rectangular waveguide sections including at least two series of such sections, the wave guides in each of said series being arranged with adjacent broad walls and each series positioned adjacent the other series whereby narrow side walls of one series are adjacent narrow walls of said other series, each of said waveguide sections having cross sectional dimensions such that said sections are beyond cutoff for the fundamental electromagnetic wave energy but which allow propagation therein of said undesired electromagnetic energy, said array being positioned along one wall of said segment with the longitudinal axis and broad walls of said sections normal to the longitudinal axis of the waveguide segment whereby one end of each of said waveguide sections of said array is coupled to said waveguide segment through at least one aperture in said one wall; and electromagnetic energy absorbent material positioned in each of said waveguide sections to absorb electromagnetic wave energy therein.

17. A frequency selective absorptive filter for removing electromagnetic wave energy of predetermined frequencies and modes from a waveguide system wherein electromagnetic wave energy of desired fundamental frequency and undesired electromagnetic wave energy of higher frequency is propagated including the combination of a waveguide segment to be inserted in the waveguide system such that electromagnetic waves therein must pass through said waveguide segment; an absorptive means for eliminating substantially all wave energy of all frequencies above said predetermined frequency from said waveguide segment without substantial attenuation of the wave energy of frequencies below said predetermined frequency, said means comprising an array of rectangular waveguide sections arranged with parallel longitudinal axes including at least two series of such sections, each of said sections having cross sectional dimensions such that said sections are beyond cutoff for the fundamental electromagnetic wave energy but which allow propagation therein of said undesired electromagnetic wave energy, the waveguides in one of said series including a plurality of sets of at least two waveguides arranged side by side with adjacent narrow walls, the waveguides in the other of said series including a plurality of wave guides, said two series being intercalated with adjacent broad walls to form said array, said array being positioned along one wall of said segment with the longitudinal axis and broad walls of said sections normal to the longitudinal axis of the waveguide segment whereby one end of each of said waveguide sections of said array is coupled to said waveguide segment through at least one aperture in said one wall, and electromagnetic energy absorbent material positioned in each of said waveguide sections to absorb electromagnetic wave energy therein.

18. An absorptive filter for removing electromagnetic wave energy of predetermined frequencies and modes from a waveguide system which propagates a desired fundamental frequency and undesired higher frequencies, comprising: a waveguide segment for insertion in the waveguide system such that electromagnetic waves in the system must pass through said segment; an absorptive means for eliminating substantially all wave energy of all frequencies above said predetermined frequency from said waveguide segment without substantial attenuation of the wave energy of frequencies below said predeterminated frequency, said means including at least one waveguide section having dimensions which preclude propagation of energy of said fundamental frequency therein but which allow propagation therein of said higher frequencies, said waveguide section positioned with its longitudinal axis parallel to the direction of propagation in said waveguide segment, said waveguide segment and section being directly coupled by coupling apertures periodically disposed in the direction of wave propagation at intervals which are less than one-quarter wavelength at said fundamental frequency; and absorbent material positioned in said waveguide section relatively remote from said coupling apertures to absorb the wave energy of said higher frequencies without affecting transmission of said fundamental frequency through said waveguide segment.

19. An absorptive filter for removing electromagnetic wave energy of predetermined frequencies and modes from a waveguide system which propagates a desired fundamental wave and undesired waves of higher frequency, comprising: a waveguide segment of rectangular cross section for insertion in the waveguide system in such a manner that electromagnetic waves in the system must pass through said segment; and wave energy absorbing means for eliminating substantially all wave energy of frequencies above said pass frequency band from said main waveguide without substantial attenuation of the pass frequency band wave energy including at least two absorptive periodic structures coupled to said waveguide segment, said absorptive structures each including at least one waveguide section having cross section dimensions which preclude propagation of energy of said fundamental wave therein but which allow propagation therein of said undesired waves, each absorptive periodic structure positioned adjacent a different wall of said waveguide segment with the longitudinal axes of the waveguide sections thereof parallel to the direction of propagation in said waveguide segment, each said waveguide segment and section being directly coupled by coupling apertures periodically disposed in the direction of wave propagation at intervals which are small in comparison with the wavelength of said fundamental wave, and absorbent material positioned in each said waveguide sections relatively remote from the coupling apertures to absorb said undesired waves without affecting transmission of said fundamental wave through said waveguide segment.

20. An absorptive filter for removing electromagnetic wave energy of predetermined frequencies and modes from a waveguide system propagating a fundamental wave and spurious waves of higher frequency comprising: a first cylindrical waveguide segment for insertion in said system for receiving said fundamental and spurious waves; a second cylindrical waveguide segment coaxially disposed within said first segment, said second segment having a diameter by which it is above cutoff for said fundamental wave but is below cutoff for said spurious waves; a plurality of coupling apertures formed in spaced relation along said second segment for coupling said spurious waves into said second segment; and electromagnetic energy absorbent material positioned within said second segment between said spaced apertures for absorbing said spurious waves without substantially affecting said fundamental wave.

References Cited

UNITED STATES PATENTS

| | | | |
|---|---|---|---|
| 2,866,595 | 12/1958 | Marie | 333—73 |
| 2,869,085 | 1/1959 | Pritchard et al. | 333—73 |
| 2,877,437 | 4/1959 | Farr et al. | 333—81 |
| 2,961,619 | 11/1960 | Breese et al. | 333—10 |

HERMAN KARL SAALBACH, *Primary Examiner.*

R. F. HUNT, M. NUSSBAUM, *Assistant Examiners.*